United States Patent
Yeh

(10) Patent No.: US 6,402,034 B1
(45) Date of Patent: Jun. 11, 2002

(54) LOCKING DEVICE FOR SCANNER

(75) Inventor: Peng Sheng Yeh, Taipei Shien (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/379,739

(22) Filed: Aug. 24, 1999

(51) Int. Cl.⁷ .................................................. G06K 7/10
(52) U.S. Cl. .................. 235/472.01; 235/478; 235/492; 235/441
(58) Field of Search ................................ 235/454, 472; 312/223.2

(56) References Cited

U.S. PATENT DOCUMENTS

| | | | | |
|---|---|---|---|---|
| 5,769,515 A | * | 6/1998 | Chang | 312/223.2 |
| 5,973,866 A | * | 10/1999 | Tseng | 359/896 |
| 6,130,874 A | * | 10/2000 | Saito | 235/454 X |
| 6,247,374 B1 | * | 6/2001 | Tseng | 74/89.22 |

FOREIGN PATENT DOCUMENTS

JP            131904 A    *   5/2000

* cited by examiner

*Primary Examiner*—Michael G. Lee
*Assistant Examiner*—Allyson Sanders
(74) *Attorney, Agent, or Firm*—Rosenberg, Klein & Lee

(57) ABSTRACT

A locking device is proposed for scanner having an optical module. The optical module has a base and an image scanning means arranged on one side of the base. A locking hole and a mounting portion for the locking device are provided at predetermined locations on the image scanning means and the base, respectively. The mounting portion is a through hole piercing the base. The locking device is arranged within the mounting portion and the upper portion of the locking device is engaged within the locking hole. By using a locking device wherein the upper end thereof detaches from the locking on the scanner when the lower end thereof is pivotally rotated by the pushing force from table, the scanning means of the scanner can move laterally. The image scanning means is not shifted during portage.

4 Claims, 8 Drawing Sheets

LOCKING DEVICE FOR SCANNER

FIELD OF THE PRESENT INVENTION

The present invention relates to a locking device for scanner, more particularly to a locking device the upper end thereof detaches from the locking on the scanner when the lower end thereof is pivotally rotated by the pushing force from table such that the scanning means of the scanner can move laterally.

BACKGROUND OF THE INVENTION

The conventional scanner is generally provided with a safety lock during portage, thus preventing the shift of the scanning means of the scanner, which may cause damage. The safety lock is unlocked when the scanner is carried to desired location and begins normal work. However, the user generally is not familiar with the function and location of the safety lock and often forget to unlock this safety lock. As a result, the scanning means of the scanner will be idled and the motor is probably damaged due to overheat.

It is an object of the invention to provide an easily used locking device for scanner to overcome above problem.

To achieve above object the present invention provides a locking device for scanner the upper end thereof detaches from the locking on the scanner when the lower end thereof is pivotally rotated by the pushing force from table such that the scanning means of the scanner can move laterally. Therefore, the users only need to place the scanner on the table rather than perforating the unlock operation.

The various objects and advantages of the present invention will be more readily understood from the following detailed description when read in conjunction with the appended drawing, in which:

DETAIL DESCRIPTION OF PREFERRED EMBODIMENT

Figure 1:
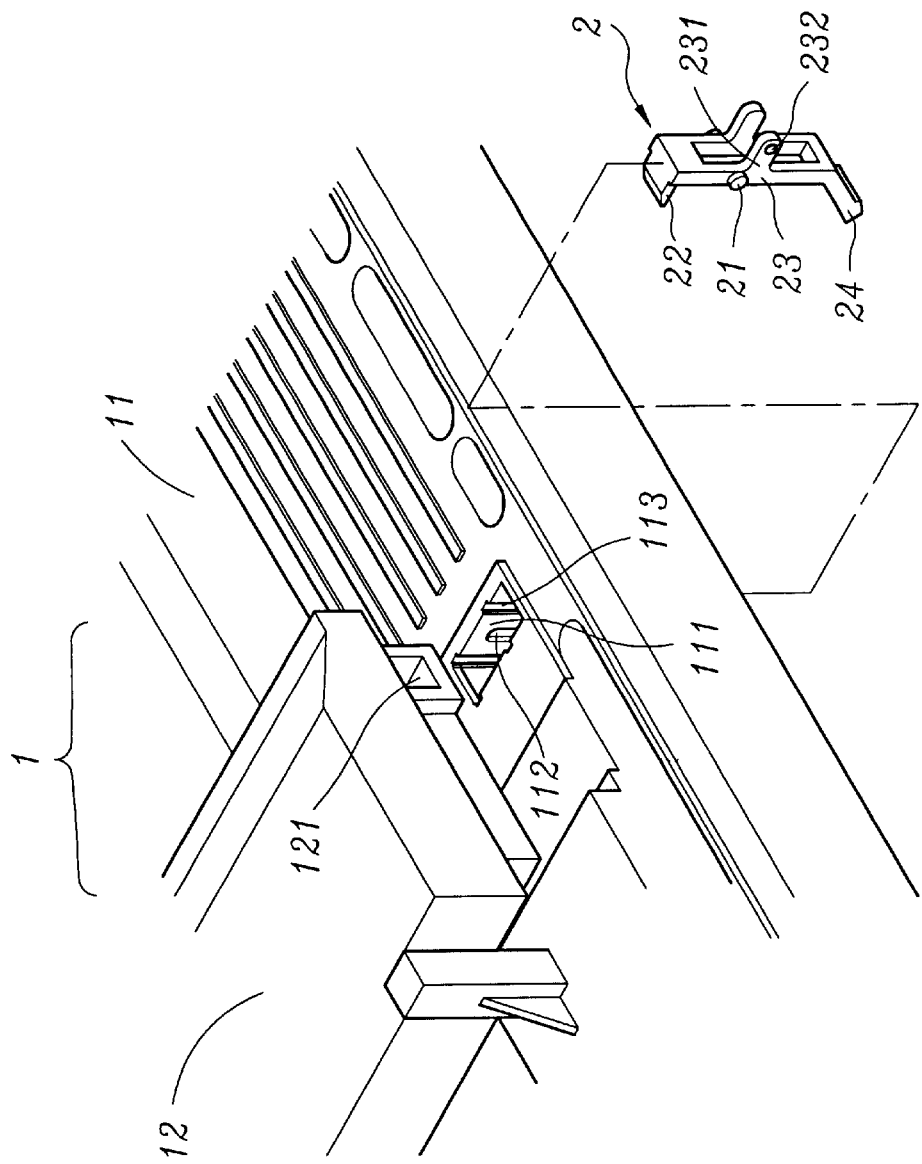
FIG. 1 is the exploded view of the present invention.
Figure 2:
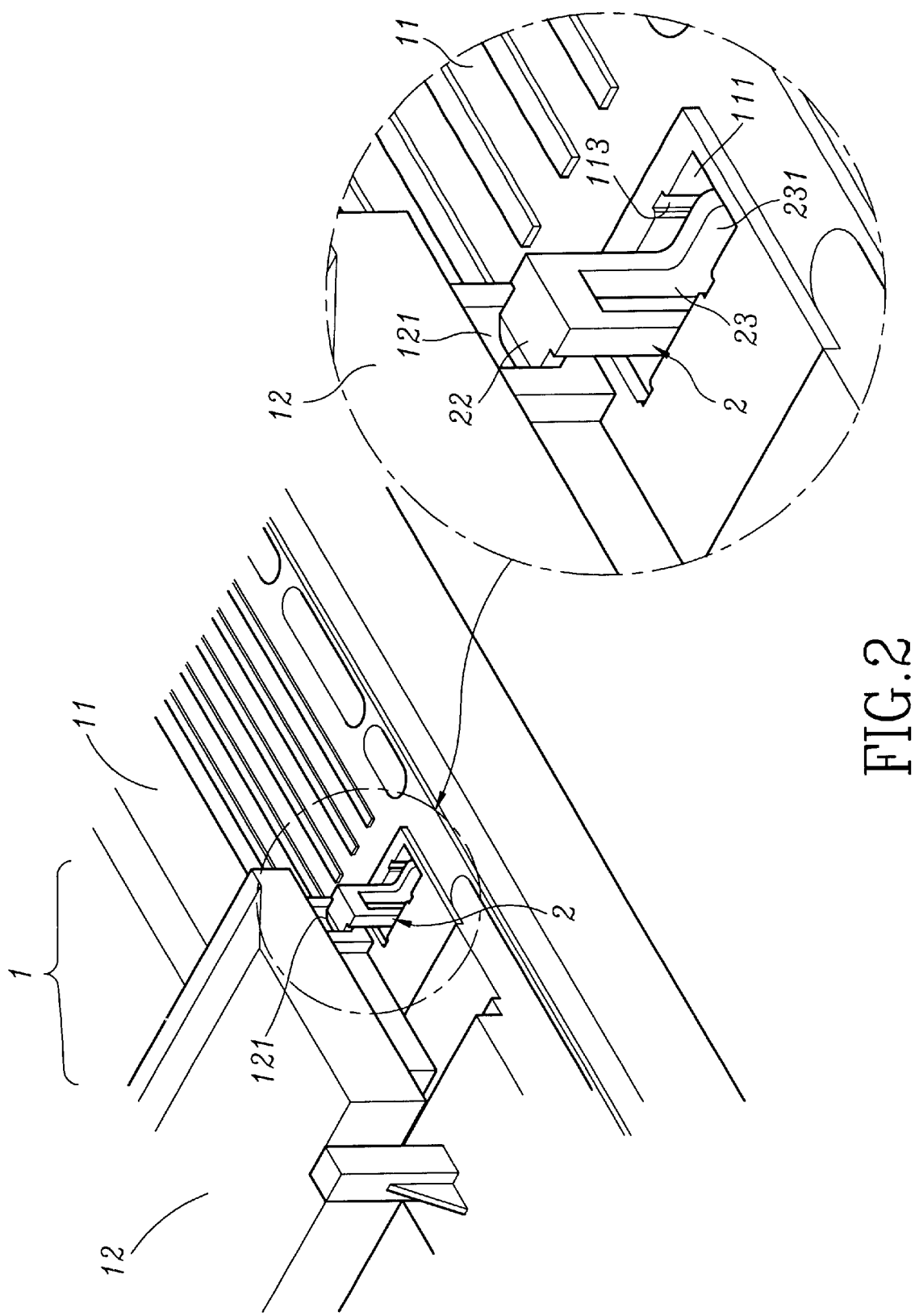
FIG. 2 is the perspective view of the present invention.
Figure 3:
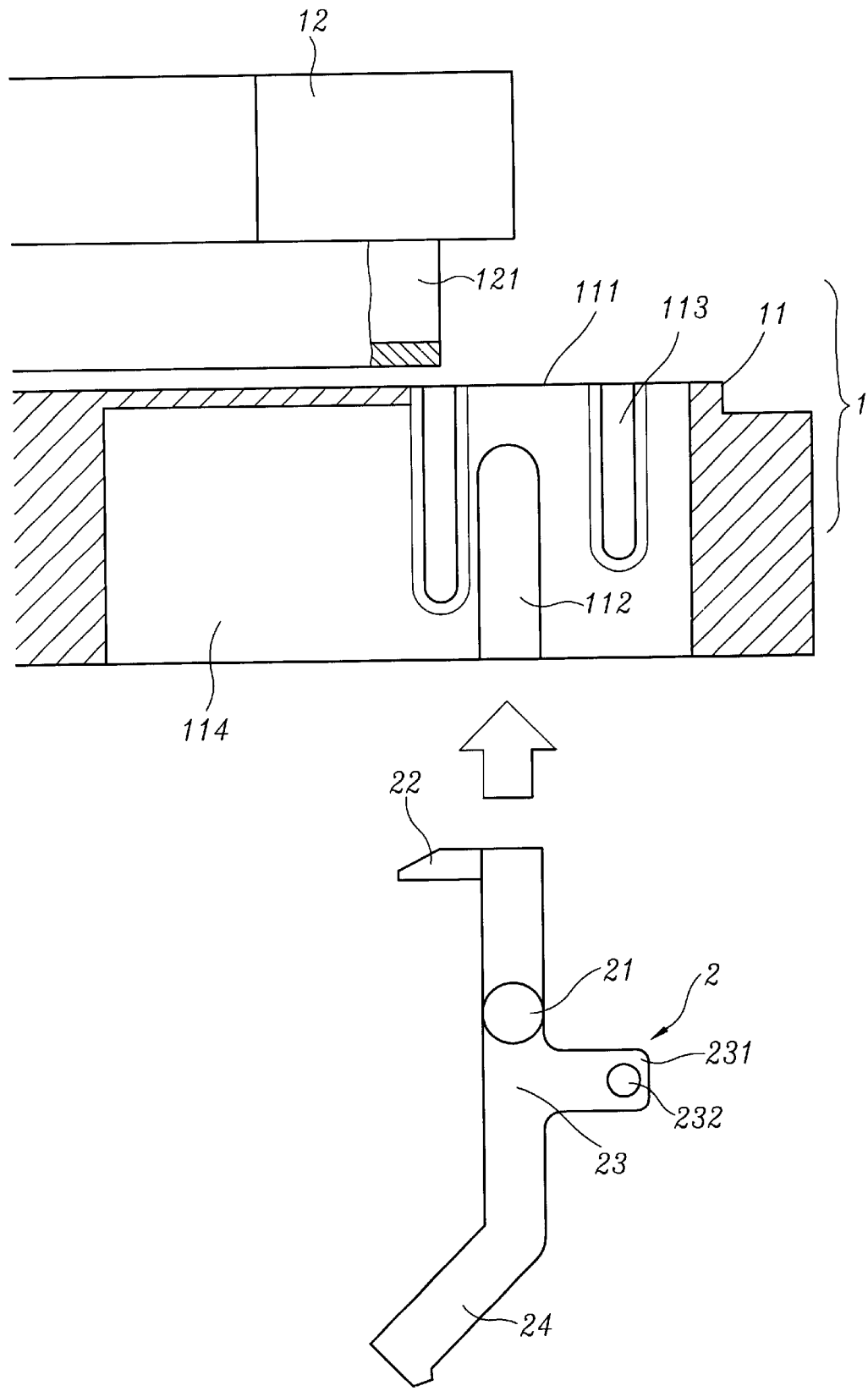
FIG. 3 is the cross section view showing the assembling of the present invention.

With reference now to FIGS. 1 to 3, the present invention provides a locking device for scanner. The scanner comprises an optical module 1 and a locking device 2. The optical module 1 comprises a base 11 and an image scanning means 12 arranged on one side of the base 11. A locking hole 121 and a mounting portion 111 for the locking device 2 are provided at predetermined locations on the image scanning means 12 and the base 11, respectively. The mounting portion 111 for the locking device 2 is a through hole piercing the base 11 and has a pivot part 112 and lock-enforcing part 113 on the both inner sides thereof, and an accommodating space 114. The locking device 2 is arranged within the mounting portion 111. The locking device 2 has a right-angle upper portion 22 locked within the locking hole 121, a middle portion 23 having a ridge 231 on right and left sides thereof. Each ridge 231 has a bump 232 projecting therefrom to shore up the lock-enforcing part 113. The locking device 2 further has a bevel lower portion 24 and two pivot shafts 21 on right and left sides of the location between the middle portion 23 and the upper portion 22, and each the pivot shaft 21 is pivotally arranged on the pivot part 112.

Figure 4:
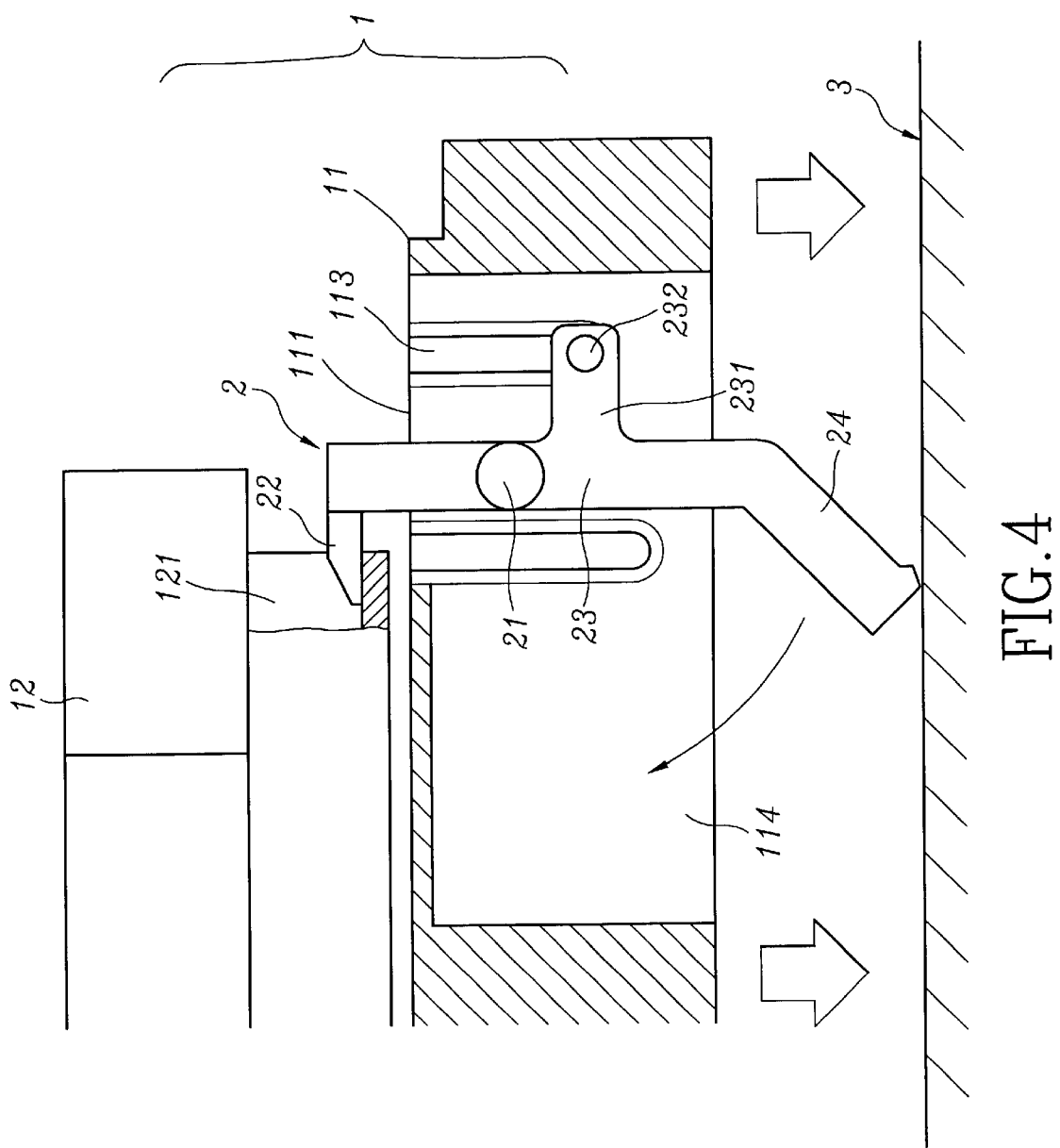
FIG. 4 is the cross section view showing the usage of the present invention.
Figure 5:
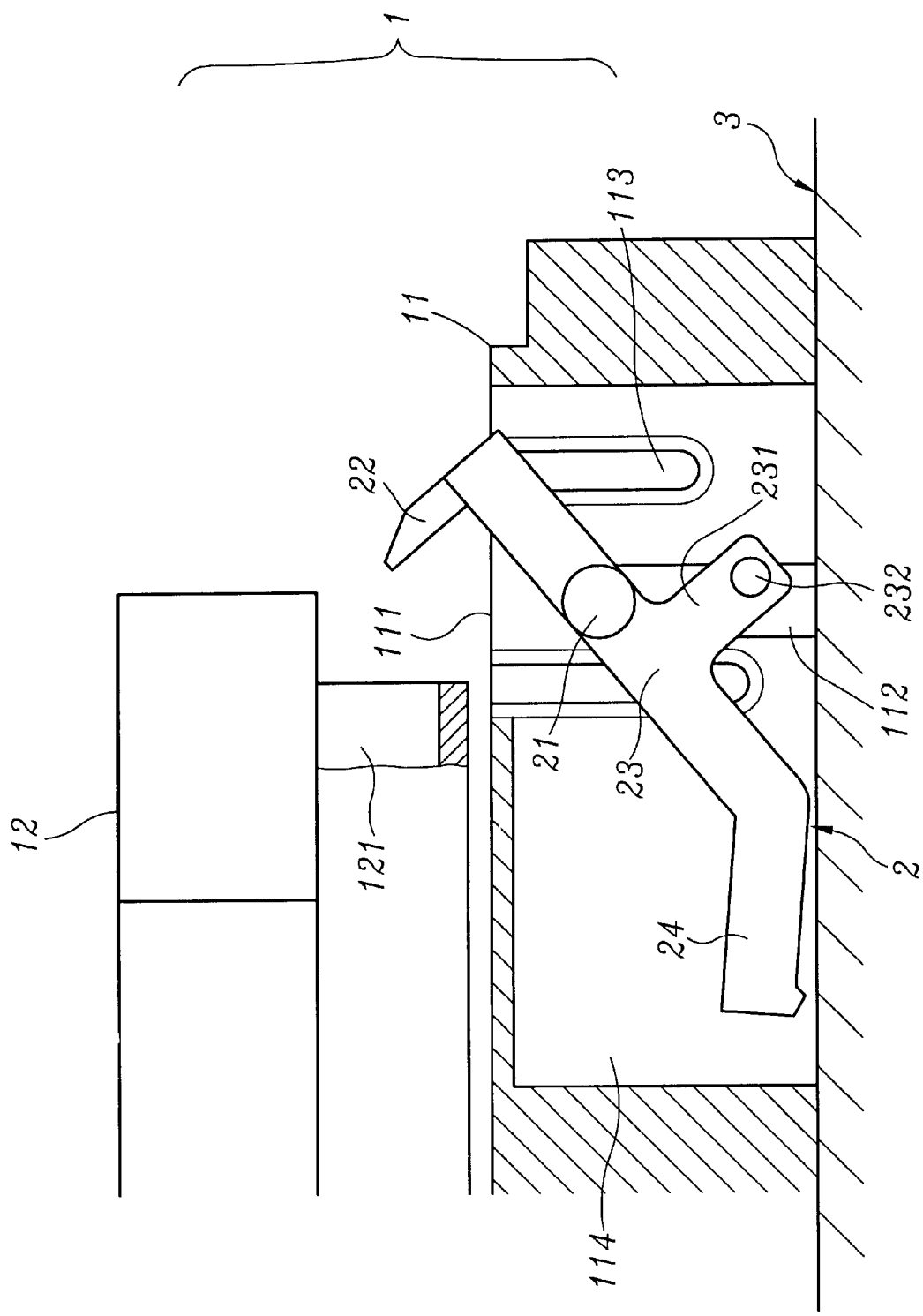
FIG. 5 is the cross section view showing the usage of the present invention.

FIGS. 4 and 5 are the cross section views showing the usage of the present invention. As shown in those figures, the lower portion 24 of the locking device 2 is generally in suspension by the package material such as formed plastic during portage. The image scanning means 12 is locked and not shifted. The lower portion 24 of the locking device 2 is pushed by the desktop 3 and the pivot shaft 21 is pivotally rotated when the scanner is placed on a desk. At this time, the lower portion 24 of the locking device 2 is inserted into the accommodating space 114 and the upper portion 22 is separated from the locking hole 121 and the bump 232 on the ridge 231 of the middle portion 23 is separated from the lock-enforcing part 113 such that the image scanning means 12 can move laterally.

Figure 6:
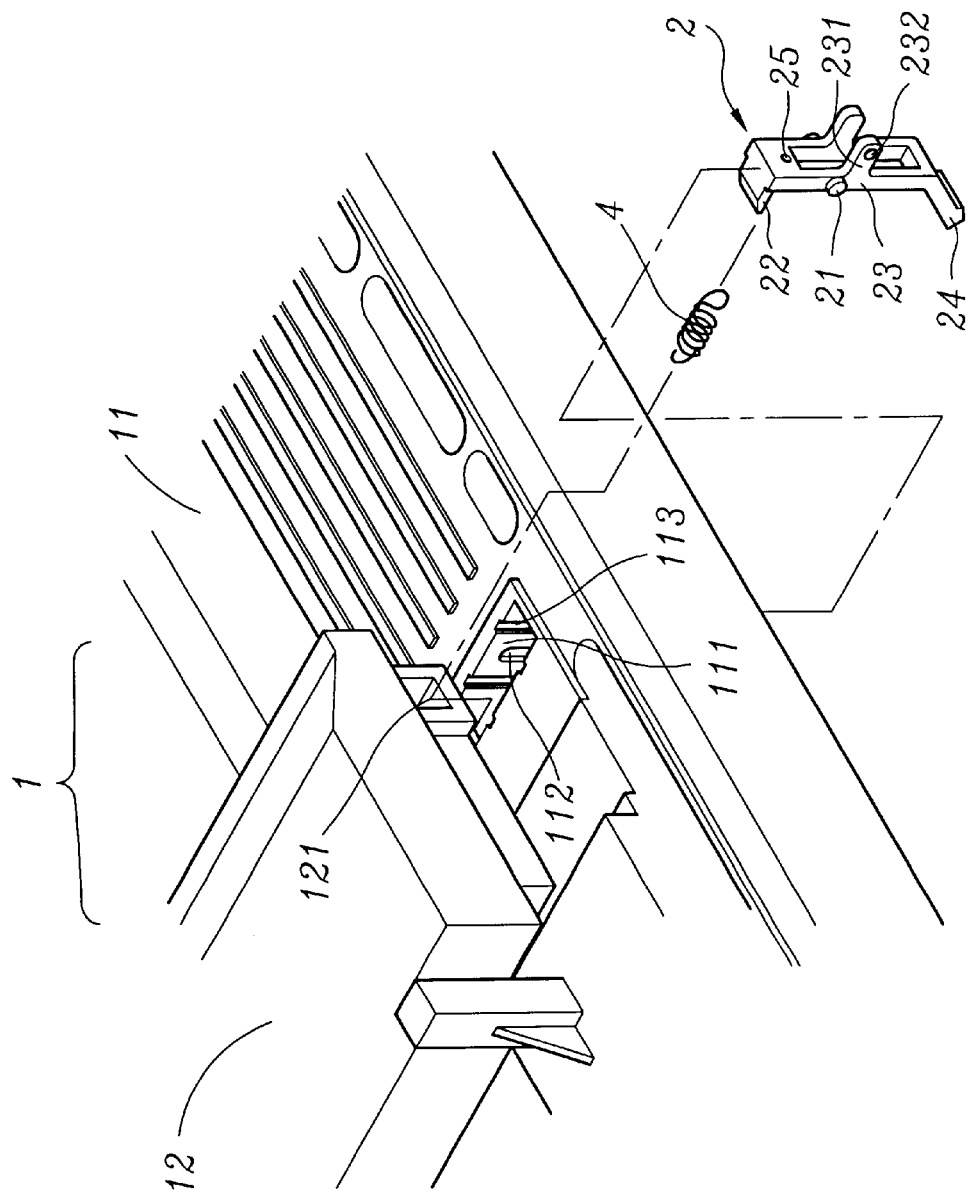
FIG. 6 is the exploded perspective view of a preferred embodiment according to the present invention.
Figure 7:
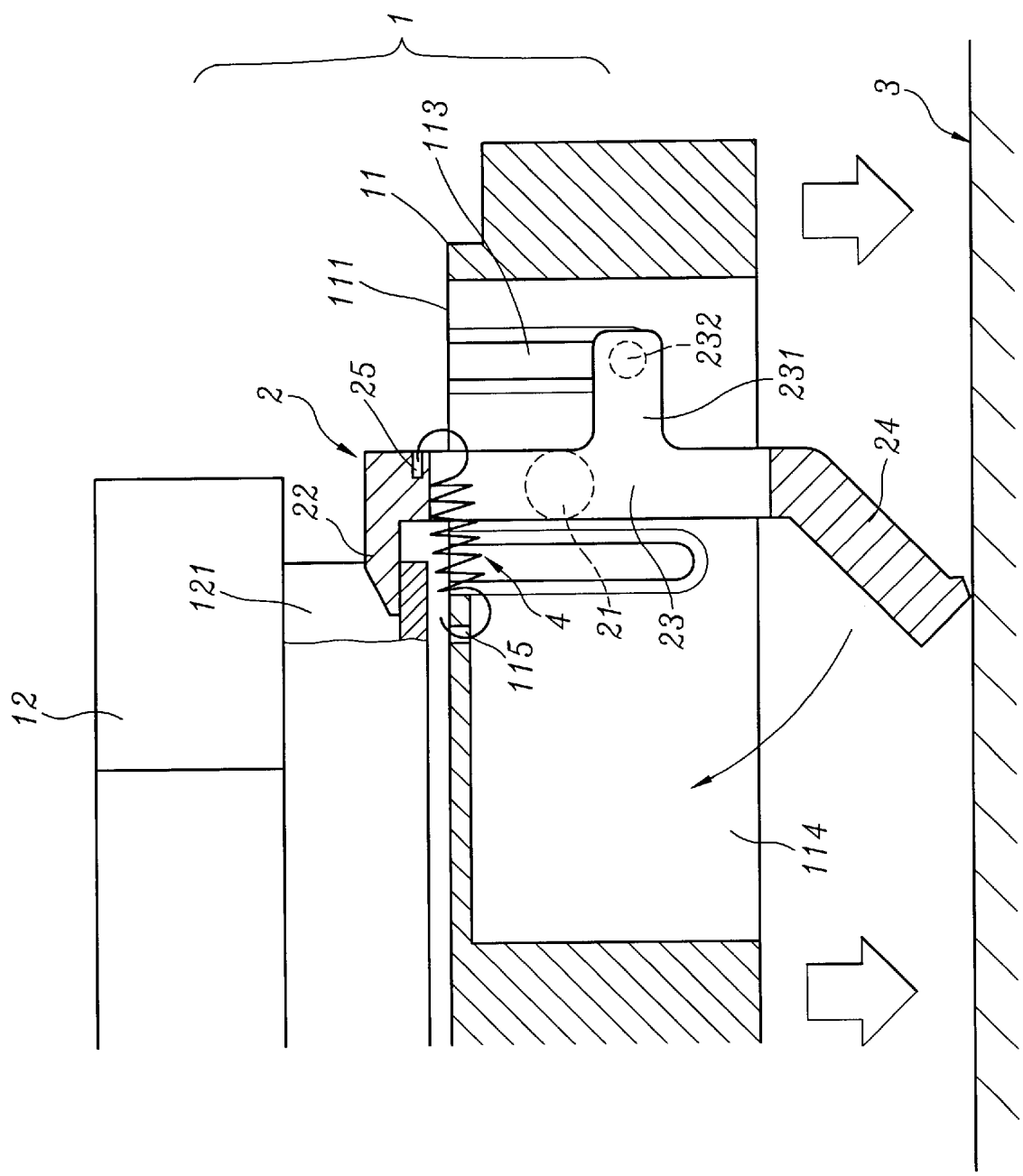
FIG. 7 is the cross section view showing the usage of a preferred embodiment according to the present invention.
Figure 8:
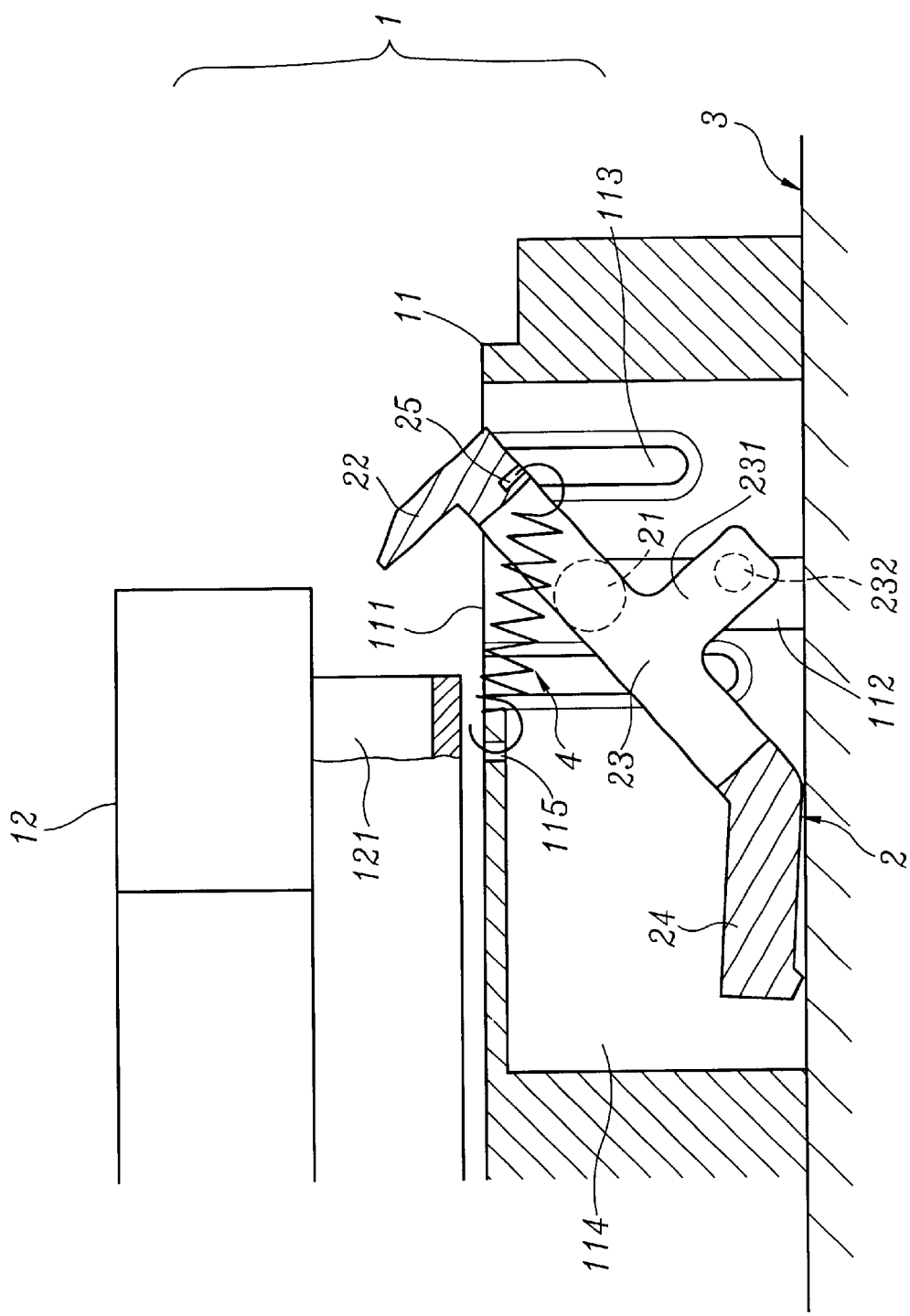
FIG. 8 is the cross section view showing the usage of a preferred embodiment according to the present invention.

FIGS. 6, 7 and 8 are the cross section views showing the usage of a preferred embodiment according to the present invention. In this preferred embodiment according to the present invention, a hook hole 115 is arranged on the mounting portion 111 of the base 11 and another hook hole 25 is arranged on the upper portion 22 of the locking device 2. Moreover, an elastic member 4 such as a spring is provided between the two hook holes 25 and 115. As shown in FIG. 8, the locking device 2 changes the position thereof and the image scanning means 12 can move laterally when the scanner is placed upon a table and ready to use. As shown in FIG. 7, the locking device 2 is automatically locked when the scanner is suspended or before touching the tabletop.

To sum up, the present invention has following advantages:

1. By using a locking device wherein the upper end thereof detaches from the locking on the scanner when the lower end thereof is pivotally rotated by the pushing force from table, the scanning means of the scanner can move laterally.
2. The users do not need to perform the unlock operation.
3. The scanner can be readily used once being placed on a smooth surface such as a table.
4. The image scanning means is not shifted during portage.
5. The locking device of the present invention automatically changes the position thereof when being used and is automatically locked when being carried by an elastic element.
6. The safety of scanner is enhanced.
7. The damage due to careless mistake of user is prevented.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A locking device for an optical scanner having an image scanning portion displaceably mounted to an upper side of a base, the base having a lower side adapted to be disposed on a support surface, said locking device comprising:

an opening formed in the base;

a locking lever pivotally mounted in said opening to rotate from a first position to a second position, said locking lever having an upper portion extendable through an upper end of said opening, said upper portion engaging a locking hole formed in the image scanning portion for blocking displacement thereof responsive to said locking lever being in said second position, said locking lever having a lower portion extendable through a lower end of said opening to contact the support surface when said locking lever is in said first position; and, an elastic element disposed in said opening and coupled between said locking lever and the base for biasing said locking lever to rotate from said first position to said second position responsive to removal of the base from the support surface, said bias force being overcome and said locking lever being rotated from said second position to said first position responsive to the base being positioned on the support surface.

2. The locking device as recited in claim 1, wherein said opening has a pair of opposing side walls with a pair of recesses respectively formed therein, said locking lever having a pair of projections respectively extending from opposing sides thereof, said pair of projections being respectively releasably engaged in said pair of recesses when said upper portion of said locking lever is engaged in said locking hole.

3. The locking device as recited in claim 1, wherein said upper portion of said locking lever has an L-shaped contour.

4. The locking device as recited in claim 1, wherein said elastic element is a spring.

* * * * *

UNITED STATES PATENT AND TRADEMARK OFFICE
CERTIFICATE OF CORRECTION

| | | |
|---|---|---|
| PATENT NO. | : 6,402,034 B1 | Page 1 of 1 |
| APPLICATION NO. | : 09/379739 | |
| DATED | : June 11, 2002 | |
| INVENTOR(S) | : Sheng Yeh Peng | |

It is certified that error appears in the above-identified patent and that said Letters Patent is hereby corrected as shown below:

TITLE PAGE, ITEM (75) INVENTORS the inventor's name should be listed as "Sheng Yeh Peng, Taipei Shien (TW)."

Signed and Sealed this

Fifteenth Day of January, 2008

JON W. DUDAS
*Director of the United States Patent and Trademark Office*